United States Patent [19]

Guess

[11] Patent Number: 5,298,168
[45] Date of Patent: Mar. 29, 1994

[54] FERROUS DITHIONITE PROCESS AND COMPOSITION FOR REMOVING DISSOLVED HEAVY METALS FROM WATER

[75] Inventor: Robert G. Guess, Beverly, Mass.

[73] Assignee: Romar Technologies, Inc., Beverly, Mass.

[21] Appl. No.: 893,978

[22] Filed: Jun. 3, 1992

Related U.S. Application Data

[63] Continuation-in-part of Ser. No. 682,129, Apr. 8, 1991, Pat. No. 5,122,279.

[51] Int. Cl.⁵ .................... C02F 1/62; C02F 1/70
[52] U.S. Cl. ......................... 210/713; 210/717; 210/719; 210/720; 210/721; 210/722; 210/912; 210/913; 210/914; 210/724; 75/712; 75/714; 75/739; 204/DIG. 13
[58] Field of Search ............... 210/710, 711, 712, 713, 210/716, 717, 719, 720, 721, 722, 724, 757, 763, 911, 912, 913, 914, 747; 75/712, 714, 715, 739, 740, 741; 423/515; 204/DIG. 13

[56] References Cited

U.S. PATENT DOCUMENTS

| | | | |
|---|---|---|---|
| 1,479,542 | 1/1924 | Hirkschkind | 75/739 |
| 3,216,790 | 11/1965 | Murib | 423/515 |
| 3,226,185 | 12/1965 | Gyan et al. | 423/515 |
| 3,260,593 | 7/1966 | Zimmerley et al. | 75/117 |
| 3,634,071 | 1/1972 | Spedden et al. | 75/109 |
| 3,770,630 | 11/1973 | Kamperman | 210/719 |
| 3,902,896 | 9/1975 | Borbely et al. | 75/109 |
| 4,076,795 | 2/1978 | Tiethof | 423/515 |
| 4,157,980 | 6/1979 | Tiethof | 423/515 |
| 4,599,177 | 7/1986 | Hayashi et al. | 210/719 |
| 4,698,162 | 10/1987 | Guilbault et al. | 210/710 |
| 4,859,447 | 8/1989 | Sanglet | 423/515 |
| 5,039,428 | 8/1991 | Wentzler et al. | 210/711 |
| 5,102,556 | 4/1992 | Wong | 210/724 |
| 5,122,279 | 6/1992 | Guess | 210/717 |

FOREIGN PATENT DOCUMENTS 2125828 3/1984 United Kingdom.

Primary Examiner—Neil M. McCarthy
Attorney, Agent, or Firm—Paul J. Cook

[57] ABSTRACT

A process for removing dissolved heavy metal from an aqueous solution is provided where the aqueous solution is mixed with a source of ferrous ion and dithionite ion in a first step at acidic pH to reduce and permit removal of the heavy metal. Solution from the first step is reacted in a second step with hydroxide slurrys obtained from third and fourth steps. A second solution from the second step is reacted in a third step with an alkali composition and a third solution. The third solution is reacted with a chelating agent for iron and an oxidizer in a fourth step. A solution of chelated iron from the fourth step is disposed of.

54 Claims, 1 Drawing Sheet

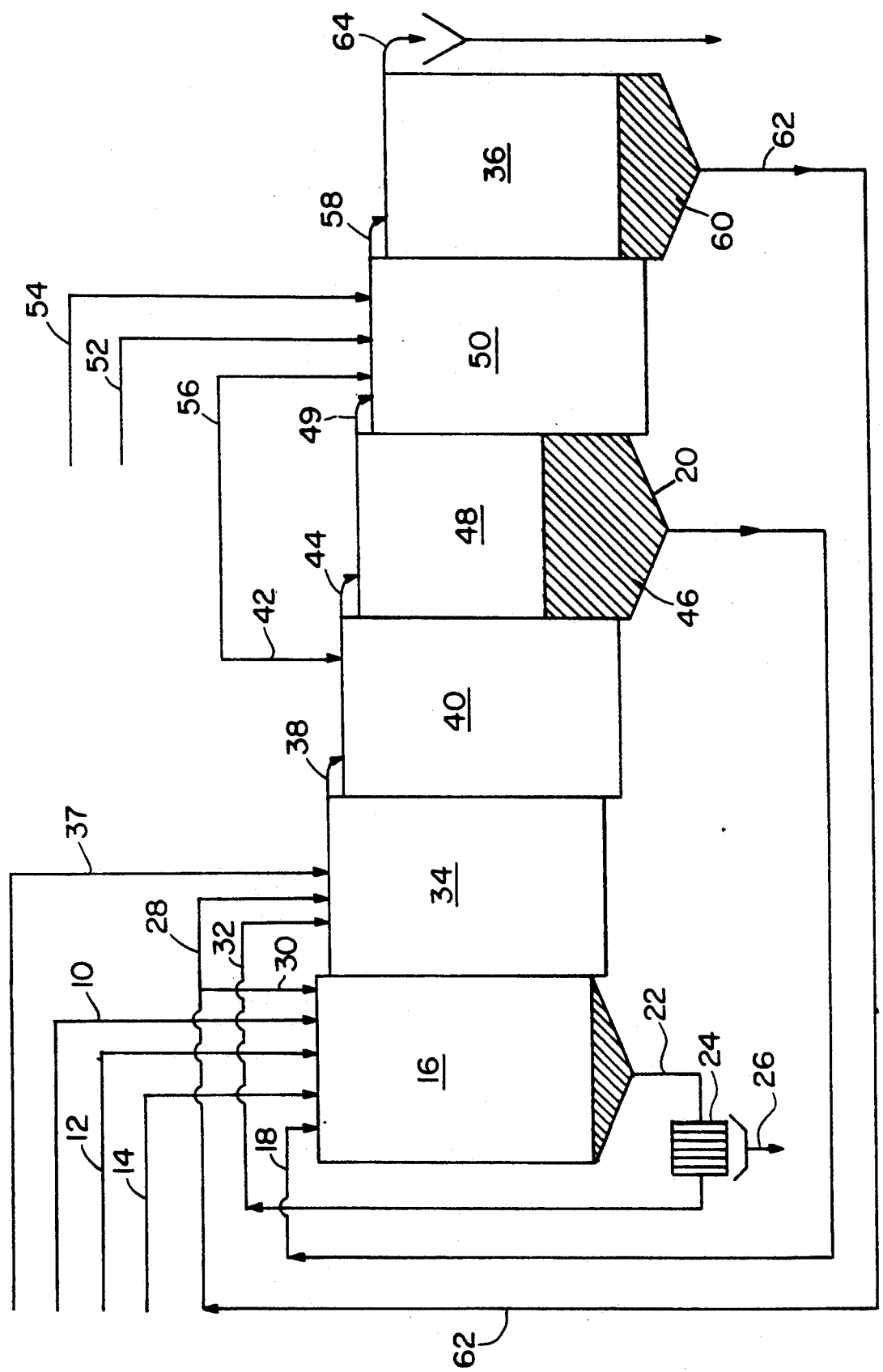

FERROUS DITHIONITE PROCESS AND COMPOSITION FOR REMOVING DISSOLVED HEAVY METALS FROM WATER

This application is a continuation-in-part of application Ser. No. 682,129 filed Apr. 8, 1991, now U.S. Pat. No. 5,122,279.

BACKGROUND OF THE INVENTION

This invention relates to a process for effectively and completely removing heavy metals from aqueous solutions with iron hydrosulfite (ferrous dithionite). More particularly, this invention relates to such a process wherein heavy metals are reclaimed, hazardous sludge is eliminated and an effluent having very low biological toxicity is produced. The present invention is useful for treating heavy metal ion containing waste waters generated by industries such as metal plating, metal surface finishing or printed circuit board manufacturing.

Prior to the present invention, it has been generally accepted that plating waste metals removed from alkaline solutions as metal hydroxide sludges must be handled as hazardous wastes. Environmental Protection Agency (EPA) jurisdiction over these wastes is well established. When generated by an electroplating facility and shipped off site, such sludge materials are defined as categorical F006 hazardous waste. Transporting and receiving and processing of these materials, even for reclamation and recycling, are restricted to EPA or State licensed operators. Due partly to this, and also due in part to the low metal concentration in such sludges, high recycling costs are incurred that usually exceed the recoverable value of the metals.

Prior to the present invention, methods for producing ferrous dithionite (iron hydrosulfite) have been explored as a possible new way to make sodium hydrosulfite. Sodium hydrosulfite is manufactured by several methods and several hundred million pounds are used worldwide each year. It is mainly use for, 1) bleaching woodpulp for newsprint, 2) reducing textile vat dyes, and 3) reductive leaching of ferric oxide from kaolin clays. All these major uses for hydrosulfite are for whitening or enhancing the color stability of materials to which it is applied. Most iron compounds are black or dark colored, thus discouraging the use of iron hydrosulfite for any of these major applications of sodium hydrosulfite.

U.S. Pat. No. 4,076,791 discloses improvements in making iron hydrosulfite and converting it to sodium hydrosulfite. More than 90% of the iron must be removed and replaced by sodium in order to use the resulting solution for leaching kaolin. A large volume of iron precipitate is produced which absorbs and wastes a large portion of the hydrosulfite, causing this process to be uneconomical. Prior to the present invention, no commercial use for iron hydrosulfite had yet been developed and efforts to develop iron chemistry in connection with hydrosulfite were abandoned.

Ferrous sulfate has been used to stabilize a sodium dithionite solution. In Japanese Patent JP 54029897, a 2% solution of sodium dithionite was used to decolorize dyeing wastewater containing Prussian Brilliant Red H3B [23211-47-4]. Adding some ferrous sulfate to the ditionite solution improves the stability of the decolored wastewater solution. There is no mention of any interaction or involvement by heavy metals existing in this prior work relating to ferrous ion and dithionite ion.

Metallic iron has long been known to react directly with certain other metals that are dissolved in acidic aqueous solutions. The iron dissolves into the acidic solution and the other dissolved metal deposits a metallic layer on the surface of the iron. Referred to as metallic replacement or cementation, this characteristic of metals has commonly been used in the commercial extraction of copper from ores and acid leaching of mine tailings. After some time, the surface of the iron is so covered with the other metal that the iron becomes unreactive and the reaction cases.

U.S. Pat. No. 3,902,896 addresses this limitation and discloses the use of a soluble thiosulfate compound to aid the cementation of such metals as copper, silver, gold, and platinum group metals from aqueous solutions. The patent discloses that the cemented metal flakes off the base metal, exposing fresh surfaces. Two properties of thiosulfate limit its utility for this purpose. In strong acid solutions, thiosulfate decomposes to form sulfur dioxide and elemental sulfur, which is colloidal and coats all surfaces it contacts. Also, dilute thiosulfate solutions are very corrosive on ferrous alloys, particularly on stainless steel materials.

U.S. Pat. No. 3,634,071 describes the use of sulfur dioxide for reducing ferric ions contained in recirculated ore leaching acid solutions. Some improvements in the cementation of copper using metallic iron were observed as relating to decreased oxidation of the iron and copper metals by ferric ions. No reference is made to dithionite. At the high sulfuric acid concentrations noted, it is very unlikely that dithionite ion could exist.

U.K. Patent Appliation GB 125828 A, filed June 16, 1983 discloses a process for removing copper ion from solution by contacting the solution with steel wool under controlled pH conditions. The copper cements over the surface of the fixed bed of steel wool, converting only a small portion of the iron into copper. This process is commercially undesirable due to 1) the uneconomically low conversion of iron to copper, and 2) the high cost of steel wool, and 3) the high labor cost for handling the materials. The recovered copper has a lower recycling value due to the cost of processing required for separating it from the residual steel wool fibers.

Many other methods exist for removing heavy metal ions from aqueous solutions, and which are commonly practiced in the pretreatment of industrial wastewaters containing environmentally toxic metals. When dissolved heavy metal solutions are free of chelating agents, they can be effectively treated by simply admixing an alkaline or caustic compound to precipitate the insoluble metal hydroxide. Sodium hydroxide, soda ash, lime or magnesium hydroxide slurry are all used to do this.

Frequently however, complexing ammonium ions or chelating compounds such as the sodium salts of ethylenediaminetetra-acetic acid (E.D.T.A.) and other having similar properties are present. They occur as ingredients in the used plating baths, cleaners and brighteners drained into the wastewater. In such cases, it is necessary either; 1) to use a strong chemical that breaks the chelant-to-heavy metal bond and forms a stable, insoluble compound or complex of the toxic metals, or 2) to add a substance that exerts a stronger attraction for the chelant than does the toxic metal ion, to free the heavy metal to precipitate as an insoluble hydroxide. Processes of both types are currently practiced.

Sodium sulfide is used to effectively precipitate heavy metals. Its sole advantage is the extremely low solubility of most heavy metal sulfides. Most are capable of existing in the presence of even the strongest chelating agents. Undesirable aspects of using a sulfide process include the extreme toxicity of hydrogen sulfide gas, which can be generated by contacting the sulfides with strong acids. Also, metal sulfide precipitates are slimy and difficult to filter. Large quantities of flocculants and filter aids are used, generating large volumes of sludge and corresponding high disposal costs.

Sodium borohydride is a strong, water soluble reducing agent that has an advantage of producing a compact, semi-metallic sludge. There are several reasons for its not having broad acceptance for heavy metal removal in wastewater treatment: 1) it is very expensive, 2) precipitated metals easily reoxidize and redissolve in the presence of dissolved ammonia, 3) dangerous concentrations of potentially explosive hydrogen gas can accumulate in the space above a reaction using sodium borohydride, and 4) at times when pH is not controlled perfectly, reactions occurring at an elevated pH of 8 or higher give off toxic fumes of hydrogen sulfide gas, dangerous to workers and sensitive equipment.

Hydrazine is another strong reducing chemical capable of breaking metal ion bond to chelants. It is used to a limited extent for heavy metal removal. But like borohydride, it too is very expensive to use and it too can generate dangerous volumes of hydrogen gas when acidified. Hydrazine has also been placed on a list of chemicals suspected of being carcinogenic. This has been a major impediment to its industrial use.

Several compounds have been used that form insoluble metal complexes with heavy metal ions. All exert a stronger attraction to the metal ion than the chelants normally occurring with the metals in the wastewaters. Insoluble starch xanthate is one such material, reportedly effective at complete removal of dissolved metal from the water. Its drawback is its generation of huge volumes of sludge, which retains a high water content and costs the user a severe penalty for disposing of same as a hazardous waste.

Other such complexing agents have gained widespread use including sodium dimethyldithiocarbamate (D.T.C.), and sodium diethyldithiocarbamate (D.E.T.C.). These are fairly effective at completely removing the heavy metal ions from solution. However, D.T.C. products are quite expensive and generate quite high volumes of sludge which requires costly reclaiming in order to recycle the recovered heavy metal. The precipitate is light in density and difficult to gravity settle. The sludge often floats on the water and gives off a foul smelling odor that is characteristic of the D.T.C. products. In addition, the dithiocarbamate compounds exhibit acute biological toxicity toward aquatic plant and animal species. Sodium dimethyldithiocarbamate is also used as the active ingredient in several EPA registered pesticide products.

At the present time, strict biological toxicity standards are being enforced upon industries by municipal sewerage authorities. Effluent toxicity is measured by placing live specimens of plant and animal species in diluted samples of such treated wastewaters. Recent data indicate that interactions exist between very low concentrations of certain heavy metals such as copper and silver, and certain anions such as nitrate, which produce more toxicity than is attributable to each component by itself. The implication of these developments is that even lower levels of removal of heavy metal ions from industrial effluents is required. A costly evaluation of background toxicity factors is required when an industry's effluent fails to meet specific toxicity limits.

All chemical methods for removing heavy metals from industrial wastes and wastewater that are of practical use and in actual practice involve chemical reactions that precipitate the metals from alkaline solutions. Certain of these processes involve chemical reduction to metallic form and others produce metal compounds, either insoluble organo-metallic complexes or metal sulfide or hydroxide sludges. The sludges of all these processes are fairly soluble in acidic water and the heavy metals are rapidly redissolved if the material is exposed to strongly acidic water.

The conventional wastewater treatment process, perhaps most frequently used by the largest number of industries, uses ferrous sulfate heptahydrate powder. Ferrous ion is substituted at a controlled acidic pH of about 2 to 3, to replace toxic heavy metal ions that are bonded by chelating agents. This allows the heavy metal ions to be rendered insoluble as hydroxides which are precipitated from an alkaline solution.

In the presence of strong chelants or free ammonia dissolved in alkaline solutions, a large excess of this source of ferrous ion is required. Normally, 5 to 10 ferrous ions are added for each copper ion being removed from chelated wastewaters. In heavily chelated streams, as many as 25 to 30 ferrous ions per heavy metal ion may be required in order to prevent the chelants from dissolving the heavy metal hydroxide. The commercial ferrous sulfate has seven waters of hydration and is only about 20% iron by weight. In some cases, for example, over 100 pounds of ferrous sulfate powder is added to the wastewater for each pound of chelated or ammoniated copper removed, thereby generating 60 to 80 pounds of sludge.

In typical treatment systems, each additional pound of iron used adds about 4 pounds to the weight of sludge made. This can be reduced to about 3 pounds of dry sludge per pound of iron used if a sludge dryer is used. When ferrous sulfate is dissolved into wastewater, it causes acidity in the water. Each mole of iron introduced this way requires using two moles of sodium hydroxide to neutralize the iron and form ferrous hydroxide. Therefore, when large excess amounts of ferrous sulfate heptahydrate powder are used, the total chemical cost for treatment is compounded. Higher hazardous waste sludge disposal costs are also incurred.

Sodium hydrosulfite is a strong, water soluble reducing agent. It can reduce heavy metal ions to zero valence and produce a metallic precipitate that is resistant to reoxidation and redissolving in acidic solutions. Commercial products are available as either a 13–14% buffered solution or as 85–95% powder. However, sodium hydrosulfite solutions are quite unstable and have a very short shelf life. Storage tanks need to be refrigerated and inert gas blanketed. The powdered products have an acid odor and a dust that is extremely irritating to a worker's eyes and nose. Damp or wet powder can spontaneously ignite into flames, creating a toxic smoke of sulfur dioxide. These objectionable properties have prevented sodium hydrosulfite products from gaining any major share of usage for heavy metal removal or for wastewater treatment in general.

It would be highly desirable to provide a safe, simple, reliable and economical process for removing heavy metals from aqueous solutions that would;

1) yield a superior quality aqueous effluent that is low in biological toxicity and compliant with all regulations for discharging into a public sewer or waterway, and,
2) eliminate producing an F006 hazardous waste sludge that is normally generated at an alkaline pH and usually has a low metal content, and,
3) reclaim the metals in a concentrated metallic form that yields a net positive value when recycled, and,
4) use readily available and economical materials that are non-hazardous and do not cause irritating or foul odors or explosive gases.

SUMMARY OF THE INVENTION

The process of this invention comprises three or four distinct steps which produce solid heavy metal particles which are recovered and slurries which are recycled within the process and a nontoxic effluent of chelated iron in aqueous solution.

In accordance with a first step of the present invention, ferrous dithionite is reacted with heavy metal ions in acidic water in a novel process which requires and uses both ferrous and dithionite ions. Heavy metals are provided from the initial solution to be treated. Redissolved heavy metal hydroxide can be recycled to the first step from the third and/or fourth steps described below. Ferrous ion also can be provided from recycled and redissolved ferrous hydroxide from the third and/or fourth steps. The dithionite ions reduce the heavy metal ions to zero valence in the presence of ferrous ions. When a chelating agent is present in the acidic water, the ferrous ions bind to the chelant compound replacing the heavy metal ions previously bonded, in the presence of dithionite ions. The reducible heavy metals form metallic particles that are suitable for economical recycling and reuse. The heavy metallic particles are recovered by gravity settling or filtering from the acidic solution.

Ferrous dithionite is preferably generated in-situ by a reaction between metallic iron particles and bisulfite ions in the acidic heavy metal solution. The same resulting composition and beneficial effects can be obtained by several routes or alternative materials. Adding both a soluble dithionite compound and a soluble ferrous compound, either separately or in a combined form, into the acidic solution of heavy metals can achieve the desirable result. Such other sources of dithionite and ferrous ions can include, for example, sodium hydrosulfite and ferrous sulfate. When combined together in the presence of dissolved heavy metal ions in an acidic aqueous solution, dithionite and ferrous ions are equally useful in precipitating heavy metals, whether generated in-situ or each is added to the reaction from separate origins.

The acidic supernatent liquid from the first step contains dissolved ferrous ions and dithionite ions. It is useful in this process for removing dissolved heavy metals from dilute solutions of chelated heavy metals, such as process rinse waters. When the residual liquid of the first step is added to a dilute acidic solution of heavy metals, the second chemical reaction step of this process occurs that removes some dissolved heavy metal. Also feeding to this second step can be a flow of slurry containing ferric oxide solids recycled from the third step and/or the fourth step. The introduction of ferric ion in the presence of heavy metal ions and dithionite ions and chelating anions facilitates breaking the chelant attractions toward the heavy metals and also improves the settling of solids produced in the downstream third step.

The liquid effluent from the second step is directed to the third step, and the dilute solution is neutralized to an intermediate pH, between about 5 and 10, (slightly acidic to slightly alkaline), by adding a suitable caustic alkaline compound. At a pH between about 5 and 10, heavy metal hydroxides co-precipitate from the solution as a dense, fast settling mixture of reduced heavy metal particles, ferrous hydroxide, and heavy metal hydroxide solids. This settled metal hydroxide and metallic particle-containing slurry is found to be further useful in this process for neutralizing the strong acidity contained in some of the concentrated metal plating and etching and regenerant solutions being reclaimed in the first step of this process. The metal hydroxides are an effective substitute for purchased new caustic. The heavy metal content in the hydroxide slurry of the third step is effectively concentrated at a higher concentration than occurring in the dilute solution, which provides for a more efficient performance of the ferrous dithionite reduction that forms metallic particles of the heavy metal. The slurry produced in the third step can be recycled to the first step, the second step, the third step, and/or a fourth step. A portion of the slurry can be withdrawn from the process for disposal in order to control the iron inventory within the process, thereby to avoid excessive build-up of iron in the process.

The supernatent effluent from the settling of the third reaction flows to an optional fourth step, a mixed reaction wherein is added a strong oxidizer and/or a strong ferric ion attracting chelant. A caustic reagent is added to maintain or increase the pH as desired. All the iron content, remaining and carried into this reaction, is oxidized to ferric ion. Alternatively, the chelant and oxidizer need not be added to the process thereby eliminating the fourth step. In another alternative process, the chelant and/or the oxidizer can be added to the second step and/or the third step.

A portion of the ferric iron is chelated and remains dissolved and stable in effluent solution. This is controlled by the flow of chelant feeding into this fourth reaction step. Just enough chelant is added to balance, and on average to equal, the net input of iron into the overall process. This use of a chelant greatly reduces or eliminates producing and disposing of an undesirable hydroxide sludge. The chelated iron is dissolved and the common chelate complexes of ferric iron do not exhibit any known toxicity to biological systems. Thus, the iron can be safely removed from the process as a solution sent to the sewer.

All residual reducing agents are destroyed in the step where oxidizer is added so that the oxidation reaction eliminates the oxygen scavenging effect of the reducing agents. This oxidation step eliminates any residual formaldehyde, for example, which is toxic and normally present in electroless plating baths.

The excess iron feeding to this optional fourth reaction, which is the portion that exceeds the holding capacity of the chelating agents, precipitates as insoluble hydrated ferric oxide. The resulting liquid effluent is extremely low in heavy metal ion concentrations, generally below detection levels of atomic absorption spectrophotometry. A desirable portion of this ferric containing slurry is recycled back to the first reaction step, the second reaction step, the third reaction step, and/or the fourth reaction step. This recycling provides the more attractive ferric ions to the replacement bonding with chelating agents and frees heavy metal ions to more readily form hydroxides in the third stage reaction. When no precipitated alkaline heavy metal hydroxide or ferrous hydroxide or any mixture thereof are withdrawn and disposed of or recycled in the form of sludge or other waste, then it can be fairly that this process totally eliminates the generation of such regulated F006 sludges. Alternatively, when the process contains insufficient chelant to form iron chelates, and no chelant is added, a small portion of the ferric oxide or hydroxide-rich slurry can be removed from the process in order to control iron inventory within the process.

In one aspect of this invention, a novel reactant composition is provided by this invention which is reactive to produce ferrous dithionite under acidic conditions. The composition comprises a solid mixture of (a) iron particles and (b) solid alkali sulfide, bisulfite or a mixture of solid alkali sulfite and bisulfite. The molar ratio of (b) sulfite, bisulfite or mixtures of sulfite and bisulfite to (a) iron is between about 0.01 and 10, preferably between about 0.1 and 5. The mixture, when added to the acidic heavy metal solution forms ferrous dithionite in-situ. The mixture is retained in a sealed container to prevent exposure to water vapor. The mixture provides a convenient means for forming ferrous dithionite in the acidic aqueous solution added to the first step.

The process of this invention provides substantial advantages over prior art processes. The iron containing aqueous effluent has low or no biological toxicity and very low or no heavy metal content. Hazardous sludge is reduced or eliminated. Reusable valuable heavy metal is recovered. In addition, the present invention provides more efficient use of raw materials and provides reduced overall operating costs.

The process of this invention reclaims heavy metals as metallic particles from concentrated aqueous acidic solutions. Heavy metals are also removed from dilute heavy metal solutions as heavy metal hydroxides. These heavy metal hydroxides are recycled and redissolved in the concentrated metal solutions from which the metallic particles are produced. In the dilute solution when treated with a strong oxidizer, ferrous ions convert to ferric ions and residual reducing agents are oxidized. The resulting effluent has low or no biological toxicity. The ferric ions produced are more readily chelated and more easily held in the final effluent solution than ferrous ions or heavy metal ions. The heavy metal hydroxides are less soluble in the oxidizing solution in the presence of co-precipitating ferric oxide, and thus are removed to a lower, less toxic concentration in the effluent. And finally, a sufficient amount of chelant is added into the oxidation reaction step to chelate the ferric ions and to balance the dissolved ferric ion remaining in the effluent with the net input of iron into the process.

A superior quality treated wastewater is produced that is low in biological toxicity and meets the strictest EPA and State environmental standards for discharge of liquid effluent to a public sewer. This new improved process provides a method for closed-loop recycling of materials that are presently disposed of as hazardous waste. This process also provides the means for minimizing and balancing chemical raw materials usage by a novel method that can totally eliminate generating any regulated F006 hazardous waste sludge.

BRIEF DESCRIPTION OF THE DRAWINGS

The FIG. 1 is a schematic diagram illustrating the process of this invention.

DESCRIPTION OF SPECIFIC EMBODIMENTS

In accordance with the method of this invention, ferrous dithionite is utilized in a first step to precipitate heavy metals from aqueous solutions. In a preferred method, iron particles and a bisulfite compound or suitable bisulfite precurser are admixed with acidic aqueous solution containing dissolved heavy metal ions. The metallic iron reacts with the bisulfite ions, producing ferrous dithionite in the presence of the heavy metal ions and in accordance with Equation 1.

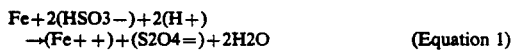

$$Fe + 2(HSO_3-) + 2(H+) \rightarrow (Fe++) + (S_2O_4=) + 2H_2O \quad \text{(Equation 1)}$$

Under the acidic condition provided, the dithionite ions react instantly with and reduce the heavy metal ions present to zero valence metallic particles. The dithionite ions are thus oxidized and become regenerated as reactive bisulfite ions, as shown by Equation 2.

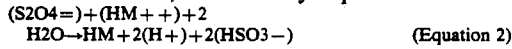

$$(S_2O_4=) + (HM++) + 2H_2O \rightarrow HM + 2(H+) + 2(HSO_3-) \quad \text{(Equation 2)}$$

Therefore as shown by Equations 1 and 2 wherein HM is a heavy metal, this reaction is self regenerating in the bisulfite ion when the reactions are performed simultaneously and insitu. This method provides a very efficient utilization of the bisulfite ion or its suitable precursor. The bisulfite-dithionite redox cycle promotes the indirect reducing reaction between the metallic iron and the heavy metal ions.

When chelating agents are present in the aqueous solutions being treated, the ferrous ions produced in Equation 1 are also beneficially utilized by bonding to chelating agents [CA=] which were previously bound to heavy metal ions. This reaction is defined by Equation 3 as follows.

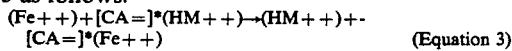

$$(Fe++) + [CA=]*(HM++) \rightarrow (HM++) + [CA=]*(Fe++) \quad \text{(Equation 3)}$$

The reactions defined by Equations 1, 2, and 3 are effected at a pH between about 1 and 7, preferably between about 2 and 4. A practical trade-off between faster reactions at lower pH values versus more efficient use of reactants at higher pH values is required which may result in varying choices from solution to solution being treated. The upper pH limit may also be governed by the tendancy to form insoluble metal hydroxides at pH values approaching neutral between about 5 and 7. The higher the concentration of dissolved metals, the lower the pH at which the insoluble hydroxides begin appearing. It is desirable to avoid hydroxide formation prior to removing the metallic heavy metal particles in order to avoid imparting hazardous waste characteristics of acid soluble heavy metal content into the reclaimed heavy metal particles.

Metal ions generally have a more positive oxidation potential when bonded to a chelate complex. Upon being dissociated from the chelant complexes by the ferrous ion, the heavy metal ions have a more negative oxidation potential and are therefore more reactive with and more readily reduced by the dithionite ion. This mutual and beneficial interaction between the ferrous ion, the chelated heavy metal ion, and the dithionite ion is imortant and useful in the present invention when chelating agents are present.

The present invention permits the use of a reactor vessel of suitable design for the first step reaction which allows the finely divided heavy metal particles to settle from the outflowing liquid. By gravity settling, a thick, dense slurry of the heavy metals can be recovered. Filtering this slurry and rinsing and drying the recovered solids produces a concentrated, highly metallic form of material, suitable for recycling and reuse of the metals in other processes.

In accordance with the process of this invention, ferrous dithionite is utilized to reduce heavy metal ions to metallic particles of said heavy metals. By the term "heavy metal" as used herein, is meant a metal having:
1) an atomic weight heavier than calcium, that is, greater than 40.08, and,
2) its compounds exhibit biological toxicity when released into the environment. Representative heavy metals include copper, nickel, tin, lead, cadmium, cobalt, mercury, chromium, zinc, manganese, silver, gold, platinum, palladium, vanadium, arsenic, antimony, bismuth, indium, rhodium, ruthenium, technecium, molybdenum, niobium, osmium, iridium, uranium, plutonium, lanthanides, actinides, and mixtures thereof.

As set forth herein, one precursor raw material source of ferrous dithionite hereunder comprises the novel composition of this invention reacting at an acidic pH. However, it is to be understood that the process of this invention using ferrous dithionite for removing heavy metals from water can be utilized regardless of the source or form of the ferrous dithionite or precursors of ferrous dithionite, or bisulfite used to react with metallic iron particles, and regardless of the source or form of the metallic iron particles used.

For example, a solution of acidic sodium or potassium or ammonium bisulfite can be made up by dissolving in water to a desired concentration, sodium or potassium or ammonium metabisulfite. Likewise, sodium hydroxide or potassium hydroxide or ammonium hydroxide solutions can be treated with liquid or gaseous sulfur dioxide to produce a usable solution containing bisulfite ions. Any or all of these ingredients can be added separately or in combination directly into the heavy metal containing aqueous solution into which the metallic iron is directly added.

In another method, a ferrous dithionite solution consists of ferrous ions and dithionite ions, each provided by separate means. The dithionite ions can be provided from sodium hydrosulfite and the ferrous ions can be provided from ferrous sulfate. When both such materials are added, either combined or separately, to an acidic heavy metal solution, the desired results of the process of this invention occur.

Similarly, when bisulfite ions are exposed to the reducing influence of sodium borohydride under certain conditions, dithionite ions are produced. When such borohydride reaction with bisulfite ion occurs in the presence of ferrous ions or ferric ions which are reduced to ferrous ions, then ferrous dithionite as applicable hereunder is formed. When such ferrous dithionite is either formed or admixed in the presence of heavy metals, then the process of this invention is obtained.

Alternatively, when metallic zinc is contacted with an aqueous solution containing dissolved bisulfite ions, such as occurs when sulfur dioxide is dissolved in water, dithionite ions are produced. When such dithionite ions are used or produced in the presence of ferrous ions and heavy metal ions in aqueous solution, or are added into such a solution containing both ferrous ions and heavy metal ions, the process of this invention is obtained.

Likewise, when metallic aluminum is contacted with an aqueous solution containing dissolved bisulfite ions, such as occurs when sulfur dioxide is dissolved in water, dithionite ions are produced. When such dithionite ions are used or produced in the presence of ferrous ions and heavy metal ions in aqueous solution, or are added into such a solution containing both ferrous ions and heavy metal ions, the process of this invention is obtained.

A novel reactant composition is provided by this invention which is reactive to produce ferrous dithionite under acidic conditions. The composition comprises a solid mixture of (a) iron particles and (b) an alkali metal sulfite, or an alkali metal bisulfite, or ammonium sulfite, or ammonium bisulfite, or a mixture of two thereof. The proportions of iron particles and sulfur containing compounds used to make up this composition are such that between about 0.01 and 10 moles, preferably between about 0.1 and 5 moles of sulfite and/or bisulfite are present with each mole of iron. This reactant is particularly suitable for forming ferrous ion and dithionite ion in solution when mixed with an acidic aqueous solution having a pH between about 1 and 4.

While the size of the iron particles is not critical to the present invention, faster reactions are obtained with smaller particles of iron. More finely divided particles provide a greater the surface area. Since this heterogeneous reaction between iron and bisulfite ion occurs on the surface of the iron particles, the greater the area of exposed surface, the faster the rate of reaction that occurs. Thus, the particles typically have a size less than about +10 mesh, preferably less than about +100 mesh, and most preferably, less than about +325 mesh.

When this novel composition is made using a sulfite compound and when it is added to an adequate volume of sufficiently acidic water, bisulfite ion is formed from the sulfite ion by Equation 4;

$$(SO_3^=) + H^+ \text{ --- } (HSO_3^-) \qquad \text{(Equation 4)}$$

and ferrous dithionite is made therefrom to substantially or completely react the iron particles in accordance with Equation 1. The optimum pH of a final reaction mixture will depend upon the intended use for the dithionite so generated. When dissolved heavy metals are present to be reduced by the dithionite, the reaction pH should be controlled within a range of about 1 to 7, preferably between about 2 and 4.

Upon removing the reclaimed metallic particles from the liquid of the first step, the residual acidic liquor contains dissolved ferrous ions and bisulfite ions and residual dithionite ions. This residual solution is found to be quite negative in ORP (oxidation reduction potential) measurement, (e.g., −400 mv to −600 mv at a pH of 2.5 to 4.5) and is highly useful as an effective reagent for supplying ferrous ions and dithionite ions to the removal of heavy metals from dilute heavy metal solutions, such as process rinse waters in a second stage reaction. Such dilute solutions typically have dissolved heavy metals in a concentration of between 10 and 100 milligrams per liter. Alternatively, water alone can be added to this step to provide the volume of water needed to remove iron as a chelated form in subsequent steps as described below.

The residual liquid from the first reaction step is added as reagent into a second step where reaction occurs in a dilute acid aqueous solution of heavy metals. Other desirable reagents may also be added, such as additional sources of either ferrous ions or bisulfite ions or iron particles or all of these. It is useful to add a portion of the ferrous hydroxide or ferric oxide slurrys produced in the third and fourth reaction step(s), respectively, of the process of this invention as described below. Some, but not all, of the slurry solids may dissolve. The ferric oxide which may remain undissolved provides nucleation sites for producing larger, heavier, faster settling solids in the subsequent third step.

In the second step reaction, chelated heavy metal ions react in accordance with Equations 2 and 3, with ferrous ions and dithionite ions at a pH between about 1 and 7, preferably at a pH between about 2 and 4. Some, but not all, of the heavy metal ions are reduced to metallic particles. Some of the heavy metal ions may remain dissolved in the acidic solution. Virtually all of the heavy metal ions complexed previously by chelant anions that may be present dissociate from the chelant ions and become free heavy metal cations. The ferrous ions enhance the breaking of chelant attractions to heavy metal ions. The chelant anion attractions are preferentially transferred to dissolved ferrous ions, which are being recycled and reused in abundant excess. Some ferric oxide or ferric hydroxide contained in the slurry from the third and/or fourth step(s) which is fed to this second step reaction is dissolved and reduced to ferrous ion by the dithionite ions which are present. This reaction further supplants the supply of ferrous ions to the second step and occurs in accordance with Equation 5, as follows.

$$[Fe_2O_3 \cdot X(H_2O)] + (S_2O_4^=) + 4(H+) \rightarrow 2-(Fe++) + 2(HSO_3-) + (X+1)H_2O \quad \text{(Equation 5)}$$

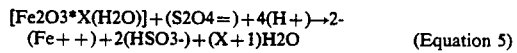

Since the process of this invention can be conducted so that no net iron hydroxide sludge is produced, the molar ratio of iron to heavy metals can be increased in this second step to as high as may be needed to further improve the removal of the heavy metal hydroxides. The entire contents of this second step product are transferred to the third step.

The third step reaction occurs with caustic soda or soda ash or an alkaline compound such as magnesium hydroxide or the like added to neutralize the acidity and raise the pH of the solution to an intermediate range of between about 5 to 10, preferably between 6 and 8. This causes some but not necessarily all of the heavy metal ions to precipitate as an unusually dense and fast settling solids material. The solids are precipitated as a slurry which is a mixture of the reduced metallic particles produced in the second step, ferrous hydroxide, ferric oxide and heavy metal hydroxides. The metallic particles formed in the second step acidic reaction and the undissolved ferric oxide particles give this third step hydroxide precipitate a ballast effect that is uncharacteristic of simple hydrated metal hydroxides. That is, this precipitate settles faster and cleaner than typical metal hydroxide solids, without the aid of polymers or other floccing agents. These chemical compositions and physical characteristics provide significant advantage for the process of this invention.

The reactions occurring in the third step of this process proceed according to Equations 6 and 7 as in the following.

$$(Fe++) + 2(OH-) \rightarrow Fe(OH)_2 \quad \text{(Equation 6)}$$

$$(HM++) + 2(OH-) \rightarrow HM(OH)_2 \quad \text{(Equation 7)}$$

As free metal cations, both ferrous and heavy metal ions form insoluble hydroxide precipitated solids at slightly acidic to alkaline pH. With the suspended solids of metallic particles and undissolved ferric oxide particles of the second step to precipitate upon, the ferrous and heavy metal hydroxides form heavy, dense, fast settling material.

The solids slurry of the third reaction step is withdrawn from the bottom of the settling vessel utilized and is recycled to the first, second, third, and/or fourth reaction step(s) of the process of this invention. The heavy metal hydroxides dissolve in concentrated heavy metal acidic solutions, contributing an alkali value to the neutralization of the strong acid solutions in accordance with Equation 8.

$$HM(OH)_2 + 2(H+) \rightarrow (HM++) + 2H_2O \quad \text{(Equation 8)}$$

The ferrous hydroxide dissolves, forming ferrous ions in the concentrated reaction solution of the first reaction step in accordance with Equation 9.

$$Fe(OH)_2 + 2(H+) \rightarrow (Fe++) + 2H_2O \quad \text{(Equation 9)}$$

The heavy metal content of the hydroxide slurry is about 50 to 250 or more times as concentrated as the heavy metal content in the dilute heavy metal solution feeding to the second reaction step. When the slurry is first mechanically dewatered, even higher ratios are obtained and the volume of the recycle is lowered.

The clarified liquid of the third step is either discarded or it flows into an optional fourth reaction step. A strong oxidizer is added, such as air, oxygen, ozone, hydrogen peroxide, sodium percarbonate, sodium persulfate, or mixtures thereof, or the like, preferably hydrogen peroxide. A measurement of ORP (oxidation-reduction potential) allows control in the range of +400 mv to +700 mv, found to be economical and adequate to accomplish the desired objectives of removing excess reducing agent and to provide sufficient oxygen to promote plant and animal life. Alternatively, the oxidizer can be added to the second or third step.

Substantially all the iron carried into this fourth step is oxidized to ferric ion, for example when hydrogen peroxide is used, according to Equation 10 as follows.

$$2(Fe++) + H_2O_2 + 2(H+) \rightarrow 2(Fe+++) + 2H_2O \quad \text{(Equation 10)}$$

The advantageous properties of ferric ion are thus obtained to effect a more complete removal of the heavy metal ions from the fourth step as insoluble hydroxides coprecipated with ferric oxide. And, the more readily chelated form of ferric ion is available in the fourth of the process.

Residual dithionite, bisulfite, and sulfite ions are oxidized to sulfate with hydrogen peroxide, for example, according to Equations 11, 12, and 13 as follows.

$$\text{Dithionite } (S_2O_4^=) + H_2O_2 \rightarrow 2(HSO_3-) \quad \text{(Equation 11)}$$

$$\text{Bisulfite } (HSO_3-) + H_2O_2 \rightarrow (SO_4^=) + (H+) + H_2O \quad \text{(Equation 12)}$$

$$\text{Sulfite } (SO_3^=) + H_2O_2 \rightarrow (SO_4^=) + H_2O \quad \text{(Equation 13)}$$

The oxygen consuming characteristic of these reducing compounds is thus neutralized. Any residual formaldehyde from electroless plating is decomposed to form carbon dioxide and water. All other oxygen consuming chemicals as may be present in the dilute solution are oxidized in this reaction substantially and made less toxic to aquatic life.

A strong chelant also can be introduced in this fourth step, or alternatively, in the second or third step, such as triethanolamine or sodium salts of ethylenediaminetetraacetic acid, (E.D.T.A.) or diethylenetriaminepentaacetic acid (D.T.P.A.), N-(hydroxyethyl)ethylenediaminetetraacetic acid (H.E.D.T.A.), citric acid, sodium hexametaphosphate, or ammonium lignin sulfonate, preferably triethanolamine together with cautic soda to maintain the pH at a desirable level between about 6 and 12. Some of the ferric iron is chelated, but more of the iron is chelated by the added chelant. The chelated ferric complex remains dissolved and stable in the effluent. The concentration of dissolved iron is controlled by the flow of chelant feeding into the process. The amount of added chelant is controlled to keep an essentially constant inventory or iron in the overall process. The chelated amount of ferric iron contained in the effluent outflow substantially equals the net iron input to the overall process to prevent undesirably increasing the iron inventory in the process. The use of a chelant in this method, in combination with the first and second and third steps of this process, eliminates producing and disposing of a regulated hydroxide sludge. Chelate complexes of ferric iron are not known to do any harm in the environment. Their use in general is widespread, with no known regulatory concern. In one alternative embodiment of the invention, no chelant is added and small amounts of sludge or slurry are removed from the process periodically to control iron inventory in the process. In any event, the amount of sludge or slurry removed is far less than that which is produced by present processes.

The excess iron feeding to this fourth reaction step, which is the portion that exceeds the holding capacity of the chelating agents, precipitates primarily as insoluble hydrated ferric oxide. Since ferric oxides are less soluble than ferrous hydroxide at a given pH, and are less hydrated, they tend to settle faster and cleaner. Dissolved heavy metals co-precipitate more effectively with this insoluble ferric oxide, so the resulting effluent is lower in heavy metal ion concentrations. Typically, the heavy metal residuals are below atomic absorption spectrophotometry detectibility. Some of the ferric oxide slurry is recycled to the second reaction step. Ferric ions improve the replacement of chelated heavy metal ions and aid the formation of heavy metal hydroxides in the third reaction step. Surplus ferric slurry from the fourth step, if any, is recycled to the first reaction step. The balance will be goverened by the amount of chelant contained in the heavy metal feedstocks.

Thus, this application discloses a closed-loop method for recycling and reusing the gravity settled slurries of metallic particles, ferrous hydroxide, ferric oxide, and heavy metal hydroxides produced in the alkaline third and fourth steps of the process of this invention. The slurries are recycled to the first, second, third, and/or fourth steps of this process and mix with acidic metal solutions which are partially neutralized by the alkalinity of the hydroxides, saving the cost of purchasing new caustic alkali material.

The heavy metal hydroxides and ferrous hydroxide are dissolved into solution with the concentrated metals. The insoluble ferric oxide is reduced by dithionite ions to make soluble ferrous ions. The heavy metals are reclaimed as metallic particles by the reaction of the first step of this process. The ferrous ion in this solution with the concentrated heavy metals is found to be useful by increasing the rate and improving the efficiency of the reactions. The first reaction step of dithionite reducing the concentrated heavy metals to zero valence is made faster and more efficient in the amount of dithionite required. When dithionite is being generated insitu using iron particles to react with bisulfite ions, then the corresponding improvement occurs by reducing the amount of iron needed and which dissolves and forms ferrous ions. This saves on the raw material cost of iron particles.

By the method of this process, a small enough net quantity of iron particles can be used, as to render it economically feasible to use a chelating agent to keep that used iron soluble in the final dilute alkaline effluent being discharged from the fourth step of the process into the public sewer. Such an amount of soluble iron is held in solution at an alkaline pH by the influence of the chelating agents contained in the concentrated and dilute solutions feeding to this process plus the amount of chelant added into the fourth step of this process.

Referring to the FIG. 1, a stream of concentrated aqueous heavy metal 10, a source of ferrous ion 12, a source of dithionite ion 14, are introduced into container 16. A recycled ferrous hydroxide-containing slurry 18 is introduced from a downstream step 20. Reclaimed heavy metal is removed through stream 22 and recovered through stream 26 by a filter 24 or the like. A portion 30 of stream 62 from a downstream step also can be introduced into container 16 to effect heavy metal precipitate. The liquid effluent 32 from reactor 16 is introduced into reactor 34 and is reacted with stream 28, a portion of stream 62 from downstream tank 36, and dilute heavy metal stream 37 such as is obtained from a rinsing step in a printed circuit production process. Alternatively, inlet stream 37 can be water in order to provide the volume of water required to remove iron as a chelate in solution. Effluent 38 which is acidic and contains heavy metals and iron ions is introduced into tank 40 together with from conduit 42 to raise pH in tank 40 to between about 5 and 10. Effluent 44 is introduced into settling tank 20 to effect separation of iron hydroxide containing slurry 46 from clarified liquid solution 48 which is directed into reaction tank 50. In reaction tank 50, liquid effluent 49 is mixed with chelant 52 and oxidizer 54 as well as caustic 56 to effect a pH of between about 6 and 12 in tank 50 and to chelate a portion of the ferric ion in tank 50 and to oxidize substantially all of the ferrous ion in tank 50 to ferric ion and to oxidize substantially all of the reducing agent in tank 50 as well as to provide sufficient dissolved oxygen as desired. Effluent 58 is directed to tank 36 to form an iron containing slurry 60 which is recycled to tank 34 through conduit 62. Effluent 64 which comprises an aqueous solution of chelated iron is directed to disposal.

The following examples illustrate the present invention and are not intended to limit the same. Examples I through XV exemplify the utility of the use of ferrous dithionite in accordance with this invention.

Example I illustrates a prior art in the metal replacement reaction between dissolved copper and steel wool without the beneficial influence of adding bisulfite ion or dithionite ion. Less than 25 percent of the steel wool is converted effectively in the removal of dissolved copper. Example II illustrates adding bisulfite ion to a chelated copper solution and thereby obtaining an in-situ formation of ferrous dithionite when the resulting solution is contacted by steel wool. This experiment, which demonstrated the reduction of dissolved copper ions by a process of this invention, achieved a yield of over 78 percent in the conversion of iron to removed copper. Example III demonstrates the utility of remotely prepared ferrous dithionite for reacting with and reducing dissolved copper to metallic particles, as another process of this invention. Example IV is a blank experiment showing that bisulfite in the absence of iron does not produce the desirable results of this invention. These first four experiments were performed with spent electroless copper bath having an initial pH of 9.2, but then acidified to a pH of 4.0 with concentrated sulfuric acid and diluted with water to a final copper concentration of 100 Mg/L. In each test, 1.00 gram of grade 0 steel wool was inserted into a 4.0 cm length section of glass tubing with an inside diameter of 1.0 cm, creating a fixed bed with a volume of 3.1416 cc. An adjustable flow micro-metering pump was used to feed exactly 10 liters of the prepared copper solution through the bed of steel wool at a flow of 200 mls per hour over a 50 hour period.

EXAMPLE I

In the first test, the feed solution was pumped through the steel wool with no further changes made (without bisulfite). The outflowing liquid was collected and accumulated in a 5 gallon container. Over the period of the test, some removal of copper was visually evident, as the appearance of the entire steel wool mass gradually turned from shiny steel color to copper colored fibers. At the end of the test, the copper content of the 10 liters of collected effluent liquid was tested by atomic absorption (AA) spectrophotometry and contained 72.0 Mg/L copper. This indicates that 28% of the copper in the feed was collected on the steel wool, and shows that less than 25 percent of the iron was used beneficially.

EXAMPLE II

In another test, 3.00 grams of sodium metabisulfite ($Na_2S_2O_5$) were added and dissolved into 10 liters of the prepared copper feed solution of Example I. This modified feed solution was then fed at 200 mls per hour through a new steel wool bed made the same way as in Example I. Within a few minutes after starting the feed, a difference was observed on the appearance of the steel wool compared to the first experiment. Only the feed end portion of the steel wool bed, approximately the first ¼ cm, showed any color effect of copper. As the run proceeded, it was evident that rather than copper covered fibers of steel wool as obtained in the first test, a compact layer of copper particles was forming and being held together by the tightly packed steel wool fibers behaving as a filter. The short length of the coloration zone revealed that an extremely fast reaction rate was being observed. After about 2 hours of operating this test, the effluent from the bed was spot sampled and AA tested for copper, finding only 0.02 Mg/L Cu in the effluent. This same result was repeated after 10 hours, 20 hours, and 30 hours of run time. At 40 hours, the effluent spot sample contained 13 Mg/L of copper and only about ½ cm of steel wool remained. The copper solids were packed up against this plug of steel wool in a mass occupying only about 0.4 cm of length. The bottom 3 cm of the tube was void of solids and contained entering feed solution only. The run was continuesd to the end of the 10 liters of feed, at which time there was no evidence of fibrous material left from the steel wool. There also was no magnetically responsive material in the solids remaining in the tube. A compact slug of copper solids about 0.5 cm long was left, held in position by the cotton plug used to hold the steel wool in the end of the tube. After the run was completed, the 10 liters of effluent solution was stirred and sampled and AA analyzed, indicting 11.1 Mg/L of dissolved copper. A rise of about 1 unit was detected in the pH of this solution, measured at 4.9 versus 4.0 for the feed.

EXAMPLE III

Another test was performed by feeding a bisulfite solution is the absence of copper, prepared by dissolving 3 grams of sodium metabisulfite in water and diluting to 100 mls volume and adjusting its pH to 4. This solution was fed in about 30 minutes at 200 mls per hour through a new steel wool column made the same as in the prior tests. The effluent of the bed was directed into a 10 liter quantity of the prepared copper containing solution of Example I, with gentle stirring applied. About fifteen minutes after starting, a change in the copper solution was noted, changing to a greener color. The darkening continued until about near the end of the run, at which point the solution had turned almost black and showed evidence of particulate solids being formed in suspension. By the end of the 30 minute feeding cycle, discrete copper colored solid particles had formed in the 10 liters of liquid being treated. A further 100 ml of flushing water was passed through the remaining bed materials and into the mixing solution. By the end of that time, about another half hour, dense particles of copper were visible in the stirring 10 liters of liquid. After settling for one hour, a sample of supernatant liquid put through a p5 Fisher filter paper was tested and found to contain 38 Mg/L of dissolved copper. The remaining steel wool fibers occupied only about ⅛ of the tubular space and had nearly lost the fibrous shape, becoming more a mass of fine black particles. Upon removing the remaining iron solids from the glass tube, rapid air oxidation took place, generating exothermic heat and rapidly forming rust-like material. This example shows that by contacting the bisulfite with iron prior to contacting copper produced a product capable of precipitating copper.

EXAMPLE IV

The procedure followed in making up the bisulfite containing copper solution fed to the test Example II above was conducted except in the absence of iron. An equal amount of bisulfite as used in the Example III test above was added into a 10 liter sample of the prepared copper containing solution. Other than a slight darkening of color toward a blue greenish tint, no visible reaction or other change occurred. No solids were formed and no removal of copper was effected by combining the bisulfite and dissolved copper in the same solution in the absence of metallic iron particles.

EXAMPLE V

This test was conducted to determine the influence exerted by chelating agents and ammonium ions in the feed solution. A new copper solution was made up from several source solutions obtained from printed circuit processes. This test solution contained portions of ammoniacal etchant bath, cupric chloride etchant bath, electroless copper plating bath, sulfuric acid/hydrogen peroxide etching bath, sodium persulfate etching bath, and copper sulfate electroplating bath in the approximate proportions that are typical of wastes disposed into a printed circuit plant wastewater system. The final mixed solution was diluted to 200 Mg/L copper and adjusted to pH 3. One liter of the solution was pH adjusted to 9.0 by adding sodium hydroxide with vigorous mixing. Copper hydroxide solids were precipitated and after 15 minutes of mixing, a drop of commercial anionic polymer was added to flocculate the precipitated solids. After settling 15 minutes, a liquid sample was withdrawn and put through a Fisher P5 filter paper and analyzed for dissolved copper. A concentration of 136 Mg/L dissolved copper indicated that 68% of the copper in the feed was effectively chelated or complexed.

The next four experiments were performed using atomized iron powder having particle sizes in the nominal range between −100 mesh and +300 mesh, and having a purity of greater than 99 percent iron, (Examples VI through IX).

EXAMPLE VI

This test was designed to measure the efficiency of removing copper from heavily chelated solutions using the simple cementation reaction with iron particles in the absence of bisulfite or dithionite. One liter of solution of Example V was placed in a beaker and provided with an overhead mixer. An equimolar quantity of iron particles weighing 0.176 grams was added to the solution and mixed for 1 hour. During that time, a coating of deposited metallic copper could be observed forming on the surface of the iron particles. After mixing for the 1 hour period, a sample was withdrawn and filtered and analyzed, indicating that 174 Mg/L or 87% of copper was still dissolved. After mixing for a second hour, another filtered sample indicated 170 mg/L of copper still in the solution, thus completing this experiment. This result indicated an uneconomically low efficiency of about 15 percent for the conversion of surface iron to copper by cementation in what is also an impractically slow reaction.

EXAMPLE VII

This experiment was carried out using another one liter sample of the subject feed solution of Example V. A 1.0 gram amount of sodium metabisulfite was added with vigorous mixing until dissolving was complete, then 0.176 gram of iron powder was added. After about 2-3 minutes, a visually different result was observed happening from that of Example VI. The suspended iron particles more nearly retained their grey-to-black color and tiny particles of copper/reddish material turned the solution to a copper-like color. After 15 minutes of mixing, a sample was withdrawn and filtered and analyzed. A dissolved copper content of 22 Mg/L was measured on the 15 minute sample, indicating 89% removal of copper from the solution.

EXAMPLE VIII

In a further experiment of the method of example VII, all conditions were kept the same except that twice as much iron powder was added. After 15 minutes of mixing, a 10 ml sample was withdrawn and filtered and analyzed, obtaining a result of 0.05 Mg/liter of dissolved copper. A pH of 4.8 was measured on the reacted solution. A magnet was placed against the bottom of the beaker and then moved up the side of the glass attracting the unreacted iron particles which were observed to be black and not coated with a layer of deposited copper.

EXAMPLE IX

In this experiment, the resulting beaker of the experiment of Example VIII was settled for 15 minutes and the liquid portion was decanted off, leaving the solids in the bottom covered with a few milliliters of liquid. A new one liter portion of the subject feed solution was added to these contents and instantly, a new portion of 1 gram of sodium metabisulfite was added and dissolved with vigorous mixing. After mixing 15 minutes, a sample was filtered and analyzed, finding 39.2 Mg/L dissolved copper remaining in solution. No magnetic iron was found remaining in the copper colored metallic solids. The total copper removed in the two reactions by the one charge of 0.352 grams of iron is 360.65 milligrams, which calculates as an efficiency in the use of the iron at 90.16 percent.

EXAMPLE X

A one liter sample of strongly acidic spent ammonium persulfate etchant containing 20.3 grams/liter of copper was neutalized with 110 mls of 50% sodium hydroxide to a 4.7 pH. An aliquot of 100 mls of aqueous solution containing 9.8 grams of dissolved sulfur dioxide was added, dropping to a 1.7 pH. With vigorous mixing, 20.3 grams of iron powder was added. A very rapid reaction producing large, fast settling copper metal particles in about four minutes was observed. Mixing was discontinued at 10 minutes of reaction time. After one minute of settling, a sample was drawn, filtered, and tested by Atomic Absorption Spectrophotometry (AA). It gave 0.33 Mg/liter in copper concentration. After vacuum filtering and water rinsing, the recovered solids were air dried for two weeks. A net weight of 23.83 grams of coppery colored dry solids containing the 20.3 grams of copper were obtained.

EXAMPLE XI

A one liter sample of a different solution containing 176 Mg/liter of dissolved copper and which was acidic at pH 2.6, was used. This heavily chelated solution was made substantially by diluting a spent electroless copper bath. Additional ammonia and E.D.T.A. were added to the solution to complex all the contained copper. An aliquot of 85 mls of the residual filtrate from Example X was added to this second solution with mixing. After about 5 minutes, a distinct change occurred. A fine, copper colored colloidal precipitate formed in the solution and the ORP decreased from a starting point of −200 mv to a final level of −500 mv over a 15 minute period. A sample of this second acidic solution was filtered and tested on the AA and found to now contain 122 Mg/liter of dissolved copper.

EXAMPLE XII

The entire residual contents of the more dilute reaction of Example XI were admixed with sodium hydroxide to an alkaline pH of 8.5. The reaction was mixed about 5 minutes, then allowed to settle for about 15 minutes. A heavy greenish/black precipitate was formed which settled rapidly and gave very clean and clear looking supernatent liquid in about 15 minutes. A sample dipped from the surface was tested on the AA and measured 0.033 Mg/L for copper.

EXAMPLE XIII

In another experiment, 500 milliliters of the residual alkaline slurries produced by several experiments of the type disclosed as Example XII above were admixed into 500 milliliters of the ammonium persulfate solution of Example X. The pH of the acid solution rose from 0.8 to 1.4 and all the solids of the hydroxides appeared to be dissolved in a light brown solution. Into this mixture was added 500 mls of spent electroless copper bath, containing 2830 Mg/liter of heavily chelated copper. Into this mixing solution, 12.00 grams of anhydrous sodium sulfite and 12.00 grams of iron powder were added. In a very short time of about 2 minutes, the ORP kicked rapidly through more negative values of $-450$ mv to $-500$ mv and large floccy copper particles were observed in rapidly clearing liquid. The reaction was allowed to mix another 10 minutes, then mixing was stopped. The metallic copper solids dropped to the bottom of the reaction beaker, leaving a slight coppery color in the supernatent liquid. An AA test on the gravity settled liquid gave 1.40 Mg/liter of copper content. An AA test on a filtered sample of the same liquid showed 0.68 Mg/liter of copper in solution.

EXAMPLE XIV

A 200 ml aliquot of the stock solution of example XI which contained 176 Mg/Liter of heavily chelated copper was diluted 5:1 with water to a concentration of 35.2 Mg/Liter and a volume of one liter. This diluted sample typifies process rinse solution in a printed circuit plant. Mixed into this one liter solution at a pH of 2.8 was 85 mls of the acidic residual liquid from Example XIII. A nearly immediate change in appearance and ORP were observed. A coppery color developed in about 5 minutes and the ORP change leveled out in about 15 minutes at about $-520$ mv. A small amount of sodium hydroxide was added to raise the pH of the reaction mixture to 8.5 and mixing was continued for 5 minutes. When mixing was stopped, a fast settling heavy precipitate was observed. After 15 minutes of settling, a dipped sample was AA tested and a reading of 0.017 Mg/liter was given. The hydroxide solids from this experiment were allowed to settle for four hours, during which time the volume of the slurry shrank to only about 65 mls volume, or about 6.5 percent of the original diluted sample volume in the experiment.

EXAMPLE XV

An aliquot of 500 mls of the acidic supernatent liquid from Example XIII was added into 500 mls of the resulting alkaline supernatent liquid of Example XIV. The pH of the mixed solution was 3.5. A measured 15 mls of 50% hydrogen peroxide solution was added dropwise with vigorous stirring. The pH of the mixture decreased to 3.1, and some degassing and heating were observed. The solution changed color to a reddish brown (rust colored) and became turbid with precipitated and finely dispersed solids. After stirring 10 minutes, caustic soda was added to a pH of 7.1, and a few drops of anionic polymer were added. A thick flocculated slurry formed, which after 1 hour of settling, produced a dark red supernatent liquid layer. Chelated ferric ion is known to exhibit this color at such a concentration. A sample of the slurry was drawn and filtered, and the filtrate was AA tested. Copper was 2.45 Mg/L and iron analysis of the same sample indicated 1270 Mg/L in the filtrate. The iron oxide filter cake is clean and well formed and easily filtered. Although the solids were not asseyed, a material balance on copper indicates very little of the copper remained in the filtered solids. This experiment demonstrated the utility of chelating and dissolving ferric iron in suitably high concentrations to allow disposing of excess iron by this method.

EXAMPLE XVI

This example demonstrates the utility for use of the reactant composition of this invention. Anhydrous sodium sulfite crystals and iron particles are dry mixed in this example, in equal weight proportions. A preferable choice of starting materials includes technical grade anhydrous sodium sulfite crystals and sponge iron powder. The procedures followed must take into account the propensity for the anhydrous sulfite to absorb and bond moisture into its crystalline matrix. The consequence of not properly allowing for this property is the potential for creating a sticky non-flowing material of poor reactivity. The mixture is found to remain viable and pourable if kept dry in a sealed container that prevents introduction of moist air. The molar ratio of this example is to provide 2.25 moles of iron for each mole of sulfite. More or less iron can be added in variations upon the example without materially affecting the physical characteristics of the composition. The intended purpose for this composition is to provide in one feasible substance the necessary ingredients for implementing the process of this invention, by adding said composition into an acidic solution of dissolved heavy metals.

An experiment wherein such a composition was used was performed in 1 liter of the feed solution of Example X, which contained a total of 20,300 milligrams of dissolved copper. A 40.6 gram portion of a well mixed dry composition prepared in accordance with the above procedure containing 20.3 grams of iron and 20.3 grams of anhydrous sodium sulfite was added directly to the 1 liter batch of feed having a preadjusted pH of 2.0. Vigorous agitation was provided for a 10 minute reaction time. Copper solids were produced and black, magnetic iron particles were observed in the final mixture. A sample was filtered and analyzed and found to contain 0.65 Mg/L of dissolved copper.

I claim:

1. The process for removing dissolved heavy metals from aqueous solutions containing said heavy metals which comprises: (a) in a first reaction step, admixing and reacting a first aqueous solution containing dissolved heavy metal ions with a source of ferrous ion and dithionite ion at a pH between about 1 and 7 to effect reduction and precipitation of said heavy metals from said first solution, separating said reduced heavy metals from said first solution, to form a first liquid effluent from said first reaction step, (b) in a second step, admixing said first liquid effluent with an aqueous composition selected from the group consisting of water and an acidic aqueous solution of heavy metals to produce a second liquid effluent, (c) in a third reaction step, admixing and reacting said second liquid effluent with a water soluble alkali composition to produce a slurry and a third liquid effluent, and (d) recycling said slurry to at least one of said first reaction step, said second step, or said third reaction step.

2. The process of claim 1 wherein an oxidizer is admixed in at least one of said second step, said third reaction step, or a fourth reaction step to which is added said third liquid effluent and a caustic composition and a reactant selected from the group consisting of a chelant, an oxidizer and mixtures thereof.

3. The process of claim 1 wherein a chelating agent is admixed in at least one of said second step, said third reaction step or a fourth reaction step to which is added said third liquid effluent and a caustic composition and a reactant selected from the group consisting of a chelant, an oxidizer and mixtures thereof.

4. The process of claim 1 wherein an oxidizer and a chelating agent are admixed in at least one of said second step, said third reaction step or a fourth reaction step to which is added said third liquid effluent and a caustic composition and a reactant selected from the group consisting of a chelant, an oxidizer and mixtures thereof.

5. The process of any one of claims 1, 2, 3 or 4 wherein said slurry is recycled to at least one of said first reaction step, said second step, said third reaction step or a fourth reaction step to which is added said third liquid effluent and a caustic composition and a reactant selected from the group consisting of a chelant, an oxidizer and mixtures thereof.

6. The process of any one of claims 2, 3, or 4 wherein a second slurry of hydroxides obtained from said fourth reaction step by adding an alkali hydroxide to said fourth reaction step is recycled to at least one of said first reaction step, said second step, said third reaction step or said fourth reaction step and said slurry is recycled to at least one of said first reaction step, said second step, said third reaction step or said fourth reaction step to which is added said third liquid effluent and a caustic composition and a reactant selected from the group consisting of a chelant, an oxidizer and mixtures thereof.

7. The process of claim 1 wherein said first aqueous solution contains chelated metal ions.

8. The process of claim 1 wherein said first aqueous solution contains dissolved heavy metals in a concentration between about 200 and 50,000 milligrams per liter.

9. The process of claim 1 wherein said first aqueous solution contains industrial metal plating waste.

10. The process of claim 1 wherein said first aqueous solution contains industrial metal etching waste.

11. The process of claim 1 wherein said first aqueous solution contains industrial ion exchange regenerant liquid.

12. The process of claim 1 wherein said first aqueous solution contains metals extracted from ores.

13. The process of claim 1 wherein said first aqueous solution contains metal ions obtained by dissolving metal hydroxides in acid.

14. The process of claim 1 wherein said first aqueous solution contains metal ions obtained by dissolving metal oxides in acid.

15. The process of claim 1 wherein said first aqueous solution contains metal ions obtained by dissolving metal hydroxides and metal oxides produced in the third reaction step and the fourth reaction step.

16. The process of claim 1 wherein the pH in the first reaction step is between about 1 and 4.

17. The process of claim 1 wherein the pH in the second step is between about 1 and 5.

18. The process of claim 1 wherein the pH in the third reaction step is between about 5 and 10.

19. The process of claim 2 wherein the pH in the fourth reaction step is between about 6 and 12.

20. The process of claim 1 wherein said ferrous ion is produced in situ from reacting iron particles.

21. The process of claim 1 wherein the source of said ferrous ion is ferrous dithionite.

22. The process of claim 1 wherein the source of said ferrous ion is ferrous sulfate.

23. The process of claim 1 wherein the source of said ferrous ion is ferrous bisulfite.

24. The process of claim 1 wherein the source of said ferrous ion is ferrous sulfite.

25. The process of claim 1 wherein the source of said ferrous ion is ferrous hydroxide.

26. The process of claim 1 wherein the source of said ferrous ion is ferric oxide reduced by dithionite ion.

27. The process of claim 5 wherein the ferrous ion and the dithionite ion are produced in-situ with a composition comprising a dry solid mixture of (a) iron particles and (b) a water soluble compound of sulfite or bisulfite or a mixture thereof wherein the molar ratio of acid sulfite and/or bisulfite to iron is between about 0.01 and 10.

28. The process of claim 1 wherein said dithionite ion is produced in-situ by reacting bisulfite ion and iron particles.

29. The process of claim 1 wherein said dithionite ion is produced in-situ by reacting bisulfite ion and zinc particles.

30. The process of claim 1 wherein said dithionite ion is produced in-situ by reacting bisulfite ion and aluminum particles.

31. The process of claim 1 wherein said dithionite ion is produced in-situ by reacting bisulfite ion and sodium borohydride.

32. The process of claim 1 wherein the source of said dithionite ion is sodium hydrosulfite.

33. The process of claim 1 wherein the source of said dithionite ion is zinc hydrosulfite.

34. The process of claim 1 wherein the source of said dithionite ion is aluminum hydrosulfite.

35. The process of claim 1 wherein said heavy metal is a composition containing at least one or more metal selected from the group consisting of copper, tin, lead, nickel, chromium, cadmium, cobalt, mercury, silver, gold, platinum, palladium, vanadium, arsenic, antimony, bismuth, indium, rhodium, ruthenium, technicium, molybdenum, niobium, osmium, iridium, uranium, plutonium, a lanthanide, and an actinide.

36. The process of claim 20, wherein said iron particles are of a size less than +10 mesh.

37. The process of claim 28 wherein the source of said bisulfite ion is an alkali metal bisulfite.

38. The process of claim 28 wherein the source of said bisulfite ion is an alkali metal sulfite.

39. The process of claim 28 wherein the source of said bisulfite ion is sulfur dioxide in water.

40. The process of claim 28 wherein the source of said bisulfite ion is sulfur dioxide with an alkali metal hydroxide.

41. The process of any one of claims 3 or 4 wherein said chelating agent is a composition containing at least one chelating agent selected from the group consisting of ethylenediaminetetraacetic acid, diethylenetriaminepentaacetic acid, N-(hydroxyethyl)ethylenediaminetriacetic acid, citric acid, sodium hexametapyrophosphate, ammonium lignin sulfonate, and triethanolamine.

42. The process of claim 41 wherein said chelating agent is triethanolamine.

43. The process of any one of claims 2 or 4 wherein said oxidizer is a composition containing at least one oxidizing agent selected from the group consisting of air, oxygen, ozone, potassium permanganate, sodium permanganate, sodium perborate, sodium percarbonate, ammonium persulfate, sodium persulfate, sodium bromate, and hydrogen peroxide.

44. The process of claim 43 wherein said oxidizer is air.

45. The process of claim 43 wherein said oxidizer is hydrogen peroxide.

46. The process of claim 1 wherein said aqueous composition is an acidic solution of heavy metals.

47. The process of claim 1 wherein said acidic aqueous solution of heavy metals contains chelated metal ions.

48. The process of claim 1 wherein said acidic aqueous solution of heavy metals is contaminated groundwater.

49. The process of claim 1 wherein said acidic aqueous solution of heavy metals is landfill leachate water.

50. The process of claim 1 wherein said acidic aqueous solution of heavy metals is municipal sewerage.

51. The process of claim 1 wherein said acidic aqueous solution of heavy metals is mine shaft drainage water.

52. The process of claim 1 wherein said acidic aqueous solution of heavy metals is slag pile drainage water.

53. The process of claim 1 wherein said acidic aqueous solution of heavy metals is mine tailings pile drainage water.

54. The process of claim 1 wherein said acidic aqueous solution of heavy metals contains dissolved metals in a concentration between about 0.1 and 200 milligrams per liter.

* * * * *